US012718720B2

(12) United States Patent
Yim

(10) Patent No.: US 12,718,720 B2
(45) Date of Patent: Aug. 25, 2026

(54) ELECTRONIC DEVICE AND METHOD OF DRIVING THE SAME

(71) Applicant: Samsung Display Co., Ltd., Yongin-si (KR)

(72) Inventor: Dale Yim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/096,657

(22) Filed: Mar. 31, 2025

(65) Prior Publication Data

US 2026/0004685 A1 Jan. 1, 2026

(30) Foreign Application Priority Data

Jun. 27, 2024 (KR) ........................ 10-2024-0084352

(51) Int. Cl.
*G09G 3/00* (2006.01)
*G09G 3/20* (2006.01)

(52) U.S. Cl.
CPC ........... *G09G 3/003* (2013.01); *G09G 3/2007* (2013.01); *G09G 2320/0242* (2013.01); *G09G 2320/0276* (2013.01); *G09G 2320/0666* (2013.01)

(58) Field of Classification Search
None
See application file for complete search history.

(56) References Cited

U.S. PATENT DOCUMENTS

| | | | | |
|---|---|---|---|---|
| 9,423,602 | B1 * | 8/2016 | Dolgoff | H04N 13/324 |
| 2009/0046142 | A1 * | 2/2009 | Cha | H04N 13/305 348/54 |
| 2012/0147162 | A1 * | 6/2012 | Park | H04N 13/324 348/E13.033 |
| 2019/0068959 | A1 * | 2/2019 | Ukai | G02B 6/122 |
| 2022/0360764 | A1 * | 11/2022 | Hong | H04N 13/15 |

FOREIGN PATENT DOCUMENTS

| | | |
|---|---|---|
| KR | 20090017169 A | 2/2009 |
| KR | 20150039066 A | 4/2015 |

* cited by examiner

*Primary Examiner* — Kenneth Bukowski
(74) *Attorney, Agent, or Firm* — CANTOR COLBURN LLP

(57) ABSTRACT

An electronic device includes a first display panel which displays a left-eye image, a second display panel which displays a right-eye image, a display driver integrated circuit which provides left-eye output grayscale data to the first display panel and provides right-eye output grayscale data to the second display panel, and a processor which provides left-eye input grayscale data and right-eye input grayscale data to the display driver integrated circuit. Each of the left-eye image and the right-eye image includes one or two selected from a first color, a second color different from the first color, and a third color different from the first and second colors.

19 Claims, 15 Drawing Sheets

FIG. 11

RCI

| | R | G | B |
|---|---|---|---|
| R | 255 | 0 | 0 |
| G | 0 | 255 | 0 |
| B | 0 | 0 | 255 |
| C | 0 | 255 | 255 |
| M | 255 | 0 | 255 |
| Y | 255 | 255 | 0 |
| W | 255 | 255 | 255 |

OF1

| | | |
|---|---|---|
| -19 | 0 | 0 |
| 16 | -41 | 0 |
| 3 | 0 | -101 |
| 19 | -41 | -101 |
| -16 | 0 | -101 |
| -3 | -41 | 0 |
| 0 | -41 | -101 |

LCI1

| | R | G | B |
|---|---|---|---|
| R | 236 | 0 | 0 |
| G | 16 | 214 | 0 |
| B | 3 | 0 | 154 |
| C | 19 | 214 | 154 |
| M | 239 | 0 | 154 |
| Y | 252 | 214 | 0 |
| W | 255 | 214 | 154 |

OF2

| | | |
|---|---|---|
| -23 | 0 | 0 |
| 21 | -51 | 0 |
| 3 | 0 | -80 |
| 23 | -51 | -80 |
| -21 | 0 | -80 |
| -3 | -51 | 0 |
| 0 | -51 | -80 |

LCI2

| | R | G | B |
|---|---|---|---|
| R | 213 | 0 | 0 |
| G | 37 | 163 | 0 |
| B | 6 | 0 | 74 |
| C | 42 | 163 | 74 |
| M | 218 | 0 | 74 |
| Y | 249 | 163 | 0 |
| W | 255 | 163 | 74 |

OF3

| | | |
|---|---|---|
| -25 | 0 | 0 |
| 23 | -57 | 0 |
| 0 | 0 | -50 |
| 24 | -57 | -50 |
| -24 | 0 | -50 |
| 0 | -57 | 0 |
| 0 | -57 | -50 |

LCI3

| | R | G | B |
|---|---|---|---|
| R | 188 | 0 | 0 |
| G | 60 | 106 | 0 |
| B | 6 | 0 | 24 |
| C | 66 | 106 | 24 |
| M | 194 | 0 | 24 |
| Y | 249 | 106 | 0 |
| W | 255 | 106 | 24 |

FIG. 12

IOF1

| | | |
|---|---|---|
| 19 | 0 | 0 |
| −16 | 41 | 0 |
| −3 | 0 | 101 |
| −19 | 41 | 101 |
| 16 | 0 | 101 |
| 3 | 41 | 0 |
| 0 | 41 | 101 |

IOF2

| | | |
|---|---|---|
| 23 | 0 | 0 |
| −21 | 51 | 0 |
| −3 | 0 | 80 |
| −23 | 51 | 80 |
| 21 | 0 | 80 |
| 3 | 51 | 0 |
| 0 | 51 | 80 |

IOF3

| | | |
|---|---|---|
| 25 | 0 | 0 |
| −23 | 57 | 0 |
| 0 | 0 | 50 |
| −24 | 57 | 50 |
| 24 | 0 | 50 |
| 0 | 57 | 0 |
| 0 | 57 | 50 |

| CASE | CONDITION | C1 | C2 | C3 |
|---|---|---|---|---|
| A1 | RG>GG>BG | OCI_R-OCI_K | OCI_C-OCI_B | OCI_W-OCI_Y |
| A2 | RG>BG>GG | OCI_R-OCI_K | OCI_W-OCI_M | OCI_M-OCI_R |
| A3 | BG>RG>GG | OCI_M-OCI_B | OCI_W-OCI_M | OCI_B-OCI_K |
| A4 | GG>RG>BG | OCI_Y-OCI_G | OCI_G-OCI_K | OCI_W-OCI_Y |
| A5 | GG>BG>RG | OCI_W-OCI_C | OCI_G-OCI_K | OCI_C-OCI_G |
| A6 | BG>GG>RG | OCI_W-OCI_C | OCI_C-OCI_B | OCI_B-OCI_K |

ELECTRONIC DEVICE AND METHOD OF DRIVING THE SAME

This application claims priority to Korean Patent Application No. 10-2024-0084352, filed on Jun. 27, 2024, and all the benefits accruing therefrom under 35 U.S.C. § 119, the content of which in its entirety is herein incorporated by reference.

BACKGROUND

1. Field

Embodiments relate to an electronic device. More particularly, embodiments relate to an electronic device which displays a three-dimensional image and a method of driving the electronic device.

2. Description of the Related Art

An electronic device such as a head mounted display (HMD) may be positioned in front of or closed to a user's eyes to provide an image to the user. The electronic device may provide a left-eye image and a right-eye image to the user, and may provide a three-dimensional image to the user by adjusting the left-eye image and the right-eye image.

SUMMARY

When the electronic device displays each of the left-eye image and the right-eye image in full color, image quality of the electronic device may be improved, but power consumption of the electronic device may increase. When the power consumption of the electronic device increases, a usage time of the electronic device may be reduced, and the electronic device may be frequently charged.

Embodiments provide an electronic device with reduced power consumption.

Embodiments provide a method of driving an electronic device which reduces eye fatigue of a user.

An electronic device according to embodiments includes a first display panel which displays a left-eye image, a second display panel which displays a right-eye image, a display driver integrated circuit which provides left-eye output grayscale data to the first display panel and provides right-eye output grayscale data to the second display panel, and a processor which provides left-eye input grayscale data and right-eye input grayscale data to the display driver integrated circuit. In such embodiments, each of the left-eye image and the right-eye image includes one or two selected from a first color, a second color different from the first color, and a third color different from the first and second colors.

In an embodiment, the left-eye image may include only the first color, and the right-eye image may include only the second and third colors.

In an embodiment, the first color, the second color, and the third color may be red, green, and blue, respectively.

In an embodiment, the first color, the second color, and the third color may be green, red, and blue, respectively.

In an embodiment, the left-eye image may include only the first and second colors, and the right-eye image may include only the third color.

In an embodiment, the first color, the second color, and the third color may be red, green, and blue, respectively.

In an embodiment, the display driver integrated circuit may include a first display driver integrated circuit which converts the left-eye input grayscale data into the left-eye output grayscale data to shift a color gamut of the left-eye image, and a second display driver integrated circuit which converts the right-eye input grayscale data into the right-eye output grayscale data to shift a color gamut of the right-eye image.

In an embodiment, the display driver integrated circuit may convert the left-eye input grayscale data into the left-eye output grayscale data to shift a color gamut of the left-eye image, and may convert the right-eye input grayscale data into the right-eye output grayscale data to shift a color gamut of the right-eye image.

In an embodiment, the display driver integrated circuit may include a first increase module which calculates first output color gamut information corresponding to a first color shift level based on reference color gamut information corresponding to a reference level and offset information corresponding to shift levels, and a second increase module which calculates second output color gamut information corresponding to a second color shift level based on the reference color gamut information and inversion offset information obtained by inverting the offset information.

In an embodiment, the display driver integrated circuit may further include a gamma module which generates a gamma grayscale value by applying a gamma curve to an input grayscale included in the left-eye input grayscale data and the right-eye input grayscale data.

In an embodiment, the display driver integrated circuit may further include a first color interpolation module which generates a first compensation grayscale value by interpolating the gamma grayscale value and the first output color gamut information, and a second color interpolation module which generates a second compensation grayscale value by interpolating the gamma grayscale value and the second output color gamut information.

In an embodiment, the display driver integrated circuit may further includes a multiplexer which outputs one selected from the first compensation grayscale value and the second compensation grayscale value as a compensation grayscale value based on a selection signal, and a degamma module which generates an output grayscale value included in the left-eye output grayscale data and the right-eye output grayscale data by applying an inverse gamma curve to the compensation grayscale value.

In an embodiment, the left-eye image may include only the first color and the right-eye image may include only the second and third colors in a first display period, and the left-eye image may include only the second color and the right-eye image may include only the first and third colors in a second display period.

In an embodiment, the left-eye image may include only the first and second colors and the right-eye image may include only the third color in a third display period.

In an embodiment, the first color, the second color, and the third color may be red, green, and blue, respectively.

In an embodiment, the first display period, the second display period, and the third display period may be sequentially repeated.

A method of driving an electronic device according to embodiments includes displaying a left-eye image including only a first color and a right-eye image including only a second color different from the first color and a third color different from the first and second colors in a first display period, and displaying the left-eye image including only the second color and the right-eye image including only the first and third colors in a second display period.

In an embodiment, the method may further include displaying the left-eye image including only the first and second colors and the right-eye image including only the third color in a third display period.

In an embodiment, the first color, the second color, and the third color may be red, green, and blue, respectively.

In an embodiment, the first display period, the second display period, and the third display period may be sequentially repeated.

In the electronic device according to embodiment, each of the left-eye image and the right-eye image includes one or two selected from the first color, the second color, and the third color, such that the power consumption of the electronic device may be reduced. In such embodiments, the color gamut of the left-eye image and the color gamut of the right-eye image are shifted, such that a three-dimensional image displayed by the electronic device may be displayed in a more three-dimensional manner.

In the method of driving the electronic device according to embodiments, a color included in the left-eye image and a color included in the right-eye image may change according to a display period, such that the eye fatigue of the user may be reduced.

BRIEF DESCRIPTION OF THE DRAWINGS

Illustrative, non-limiting embodiments will be more clearly understood from the following detailed description taken in conjunction with the accompanying drawings.

FIG. 11 is a view showing reference color gamut information, first to third level color gamut information, and first to third offset information.

FIG. 12 is a view showing first to third inversion offset information.

DETAILED DESCRIPTION

Boilerplate

Figure 1:
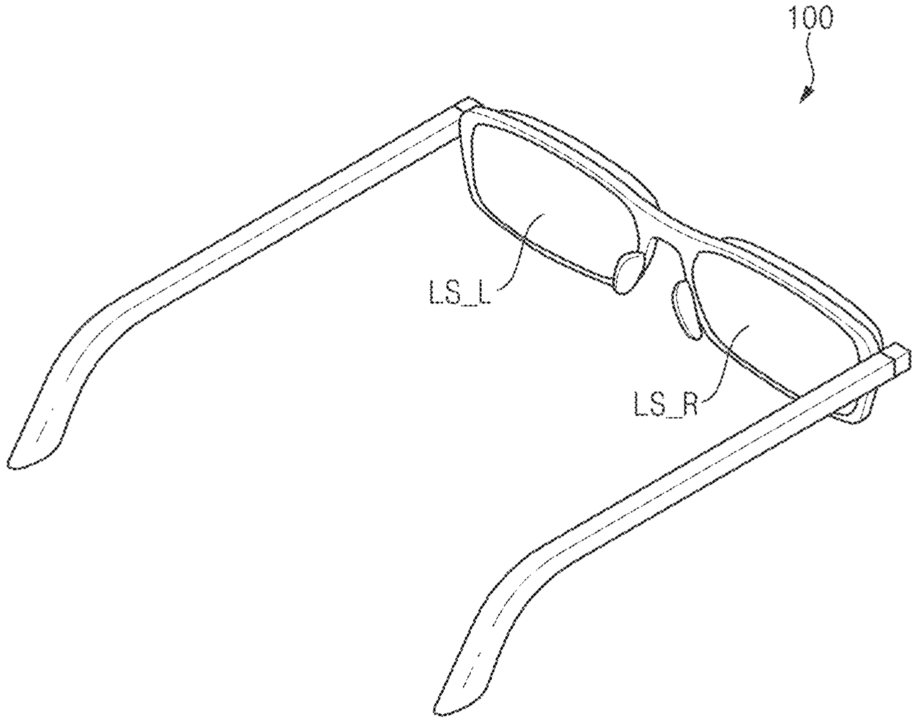
FIG. 1 is a perspective view showing an electronic device according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being “on” another element, it can be directly on the other element or intervening elements may be present therebetween. In contrast, when an element is referred to as being “directly on” another element, there are no intervening elements present.

It will be understood that, although the terms “first,” “second,” “third” etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, “a first element,” “component,” “region,” “layer” or “section” discussed below could be termed a second element, component, region, layer or section without departing from the teachings herein.

The terminology used herein is for the purpose of describing particular embodiments only and is not intended to be limiting. As used herein, “a”, “an,” “the,” and “at least one” do not denote a limitation of quantity, and are intended to include both the singular and plural, unless the context clearly indicates otherwise. Thus, reference to “an” element in a claim followed by reference to “the” element is inclusive of one element and a plurality of the elements. For example, “an element” has the same meaning as “at least one element,” unless the context clearly indicates otherwise. “At least one” is not to be construed as limiting “a” or “an.” “Or” means “and/or.” As used herein, the term “and/or” includes any and all combinations of one or more of the associated listed items. It will be further understood that the terms “comprises” and/or “comprising,” or “includes” and/or “including” when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as “lower” or “bottom” and “upper” or “top,” may be used herein to describe one element’s relationship to another element as illustrated in the Figures. It will be understood that relative terms are intended to encompass different orientations of the device in addition to the orientation depicted in the Figures. For example, if the device in one of the figures is turned over, elements described as being on the “lower” side of other elements would then be oriented on “upper” sides of the other elements. The term “lower,” can therefore, encompasses both an orientation of “lower” and “upper,” depending on the particular orientation of the figure. Similarly, if the device in one of the figures is turned over, elements described as “below” or “beneath” other elements would then be oriented “above” the other elements. The terms “below” or “beneath” can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, an electronic device and a method of driving an electronic device according to embodiments of the present disclosure will be described in detail with reference to the accompanying drawings.

Figure 2:
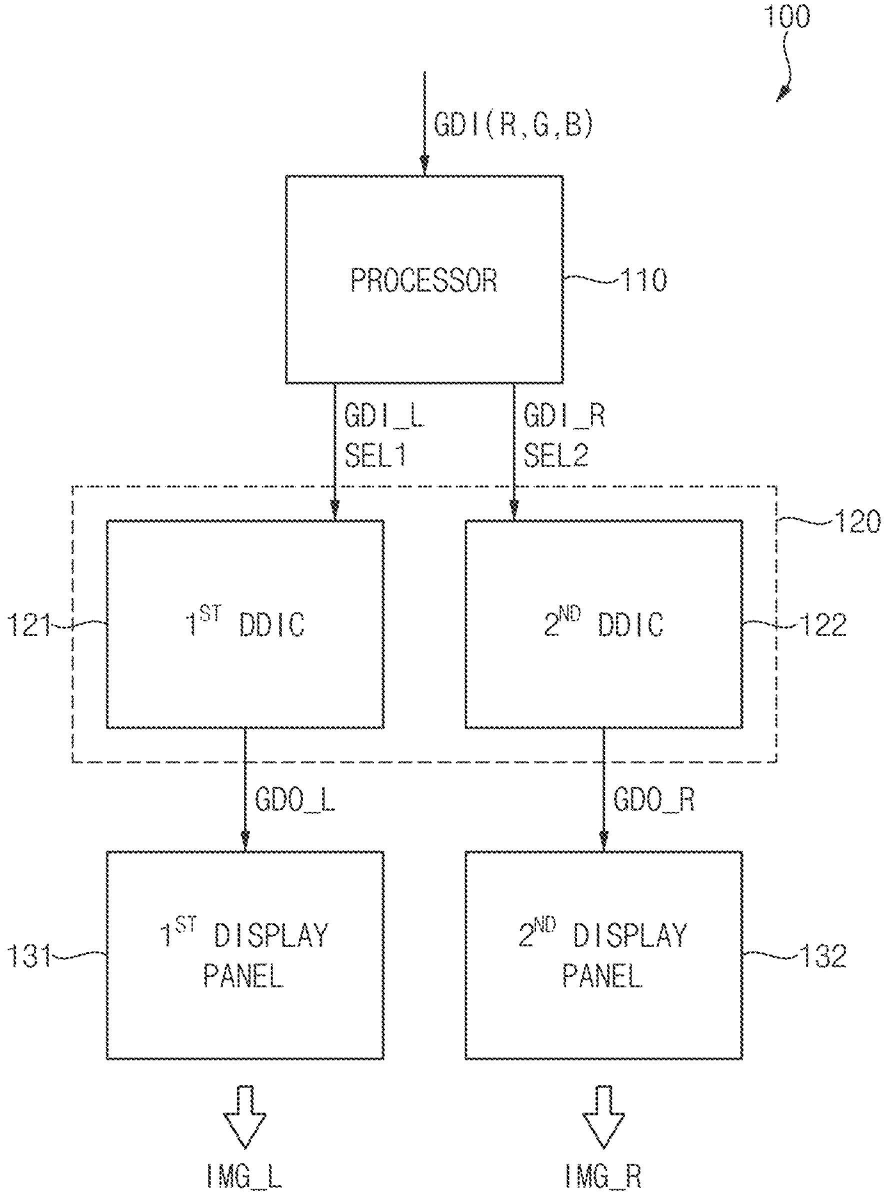
FIG. 2 is a block diagram showing an example of the electronic device of FIG. 1.
Figure 3:
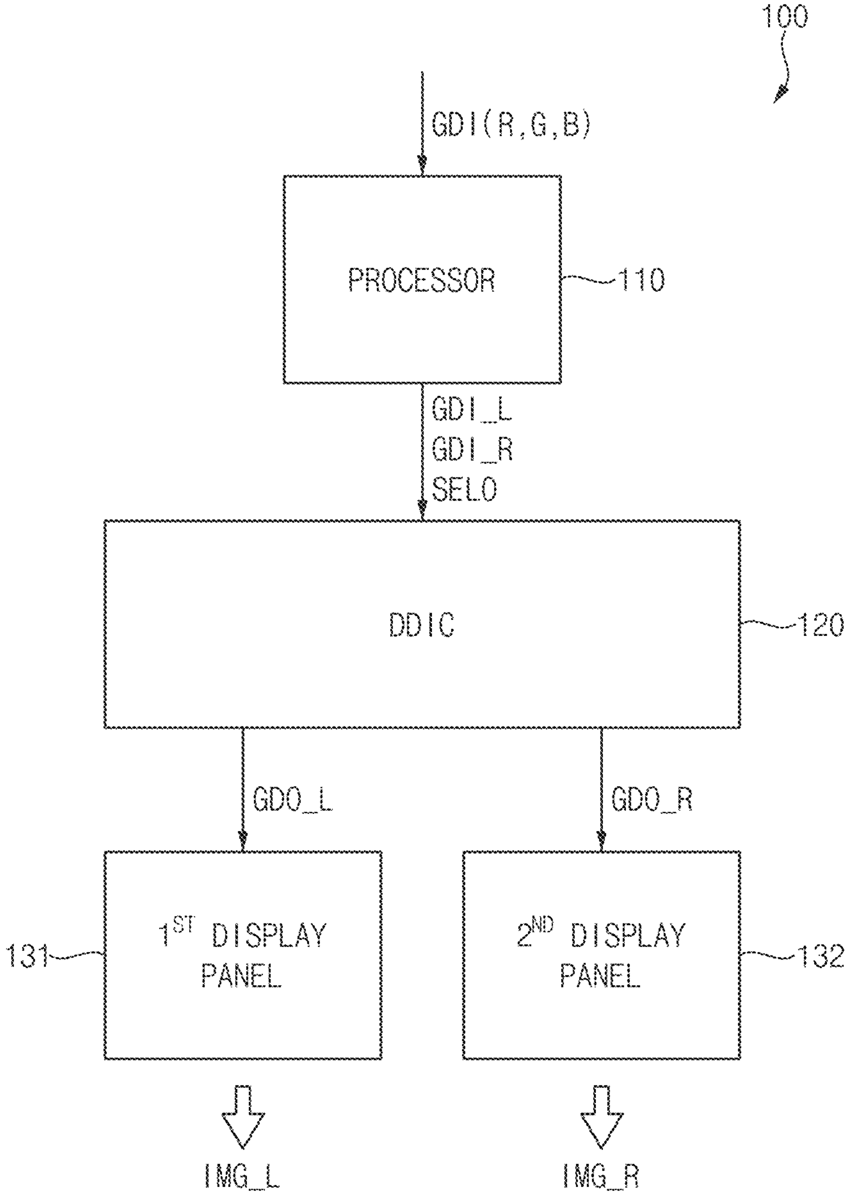
FIG. 3 is a block diagram showing an example of the electronic device of FIG. 1.

FIG. 1 is a perspective view showing an electronic device 100 according to an embodiment. FIG. 2 is a block diagram showing an example of the electronic device 100 of FIG. 1. FIG. 3 is a block diagram showing an example of the electronic device 100 of FIG. 1.

Referring to FIGS. 1 to 3, an embodiment of the electronic device 100 may include a processor 110, a display driver integrated circuit (DDIC) 120, a first display panel 131, and a second display panel 132. In an embodiment, the electronic device 100 may further include a left-eye lens LS_L and a right-eye lens LS_R.

In an embodiment, the electronic device 100 may be a head mounted display (HMD) worn on a user's head. In an embodiment, the electronic device 100 may have a shape like glasses, as illustrated in FIG. 1.

The user may view external objects through the left-eye lens LS_L and the right-eye lens LS_R of the electronic device 100, and may view a left-eye image IMG_L and a right-eye image IMG_R displayed on the left-eye lens LS_L and the right-eye lens LS_R, respectively. Accordingly, the electronic device 100 may provide augmented reality (AR) to the user.

In an embodiment, the electronic device 100 may provide a three-dimensional image to the user. The electronic device 100 may provide the three-dimensional image to the user through the left-eye image IMG_L and the right-eye image IMG_R displayed on the left-eye lens LS_L and the right-eye lens LS_R, respectively.

The first display panel 131 may display the left-eye image IMG_L, and the second display panel 132 may display the right-eye image IMG_R. The first display panel 131 may display the left-eye image IMG_L based on left-eye output grayscale data GDO_L, and the second display panel 132 may display the right-eye image IMG_R based on right-eye output grayscale data GDO_R. The first display panel 131 may be positioned on the left-eye lens LS_L, and the second display panel 132 may be positioned on the right-eye lens LS_R.

Each of the first display panel 131 and the second display panel 132 may include a plurality of pixels, and each of the pixels may include a light-emitting element. In an embodiment, the light-emitting element may be a micro organic light-emitting diode (μOLED).

The display driver integrated circuit 120 may provide the left-eye output grayscale data GDO_L to the first display panel 131, and may provide the right-eye output grayscale data GDO R to the second display panel 132. The display driver integrated circuit 120 may generate the left-eye output grayscale data GDO_L based on left-eye input grayscale data GDI_L, and may generate the right-eye output grayscale data GDO_R based on right-eye input grayscale data GDI_R.

In an embodiment, as illustrated in FIG. 2, the display driver integrated circuit 120 may be implemented with two integrated circuits. In such an embodiment, the display driver integrated circuit 120 may include a first display driver integrated circuit 121 and a second display driver integrated circuit 122. The first display driver integrated circuit 121 may convert the left-eye input grayscale data GDI_L into the left-eye output grayscale data GDO L to shift a color gamut of the left-eye image IMG_L, and the second display driver integrated circuit 122 may convert the right-eye input grayscale data GDI_R into the right-eye output grayscale data GDO_R to shift a color gamut of the right-eye image IMG_R.

In an embodiment, as illustrated in FIG. 3, the display driver integrated circuit 120 may be implemented as a single integrated circuit. In such an embodiment, the display driver integrated circuit 120 may convert the left-eye input grayscale data GDI_L into the left-eye output grayscale data GDO_L to shift the color gamut of the left-eye image IMG_L, and may convert the right-eye input grayscale data GDI_R into the right-eye output grayscale data GDO_R to shift the color gamut of the right-eye image IMG_R.

The processor 110 may provide the left-eye input grayscale data GDI L and the right-eye input grayscale data GDI_R to the display driver integrated circuit 120. The processor 110 may generate the left-eye input grayscale data GDI_L and the right-eye input grayscale data GDI_R based on input grayscale data GDI(R, G, B). The input grayscale data GDI(R, G, B) may include a red grayscale value R, a green grayscale value G, and a blue grayscale value B. The input grayscale data GDI(R, G, B) may correspond to a full-color image. In an embodiment, the processor 110 may further provide a selection signal SEL0, SEL1, and SEL2 to the display driver integrated circuit 120. In an embodiment, the processor 110 may be an application processor (AP).

In an embodiment, as illustrated in FIG. 2, where the display driver integrated circuit 120 is implemented with two integrated circuits, the processor 110 may provide the left-eye input grayscale data GDI_L and a first selection signal SEL1 to the first display driver integrated circuit 121, and may provide the right-eye input grayscale data GDI_R and a second selection signal SEL2 to the second display driver integrated circuit 122. In an embodiment, as illustrated in FIG. 3, where the display driver integrated circuit 120 is implemented with single integrated circuit, the processor 110 may provide the left-eye input grayscale data GDI_L, the right-eye input grayscale data GDI_R, and a selection signal SEL0 to the display driver integrated circuit 120.

Each of the left-eye image IMG_L displayed on the first display panel 131 and the right-eye image IMG_R displayed on the second display panel 132 may include one or two selected from a first color, a second color different from the first color, and a third color different from the first and second colors. Accordingly, the processor 110 may generate the left-eye input grayscale data GDI_L based on one or two of the red grayscale value R, the green grayscale value G, and the blue grayscale value B of the input grayscale data GDI(R, G, B), and may generate the right-eye input grayscale data GDI_R based on one or two of the red grayscale value R, the green grayscale value G, and the blue grayscale value B of the input grayscale data GDI(R, G, B).

In a comparative example according to the prior art, each of the left-eye image and the right-eye image may include the first color, the second color, and the third color, and the electronic device may display a full-color three-dimensional image. Accordingly, image quality of the electronic device may be improved, but power consumption of the electronic device may increase.

In embodiments of the present disclosure, each of the left-eye image IMG_L and the right-eye image IMG_R may include one or two of the first color, the second color, and the third color, and the electronic device 100 may display a semi-color three-dimensional image. Accordingly, power consumption of each of the first display panel 131 and the second display panel 132 may be reduced, and power consumption of the electronic device 100 may be reduced.

Further, in embodiments of the disclosure, the color gamut of the left-eye image IMG L and the color gamut of the right-eye image IMG_R may be shifted, such that color tone of the left-eye image IMG_L and color tone of the right-eye image IMG_R may be adjusted. Accordingly, the three-dimensional image displayed by the electronic device 100 may be displayed more stereoscopically.

In an embodiment, each of the left-eye image IMG_L and the right-eye image IMG_R may include one or two of the first color, the second color, and the third color in a low-power mode of the electronic device 100. In an embodiment, for example, the low-power mode may be activated when a charge rate of a battery included in the electronic device 100 is lower than a reference charge rate. In an embodiment, for example, the low-power mode may be activated by the user's setting of the electronic device 100.

Figure 4:
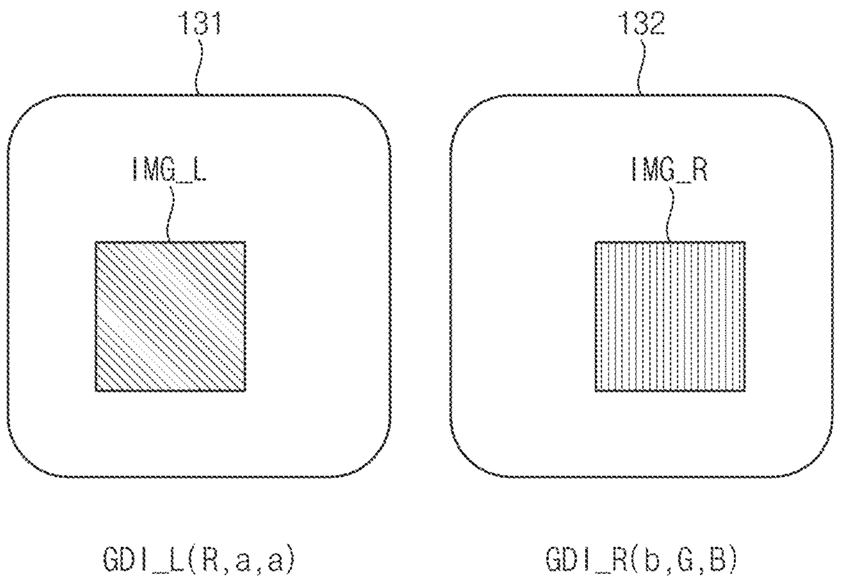
FIG. 4 is a view showing a left-eye image and a right-eye image according to an embodiment.
Figure 5:
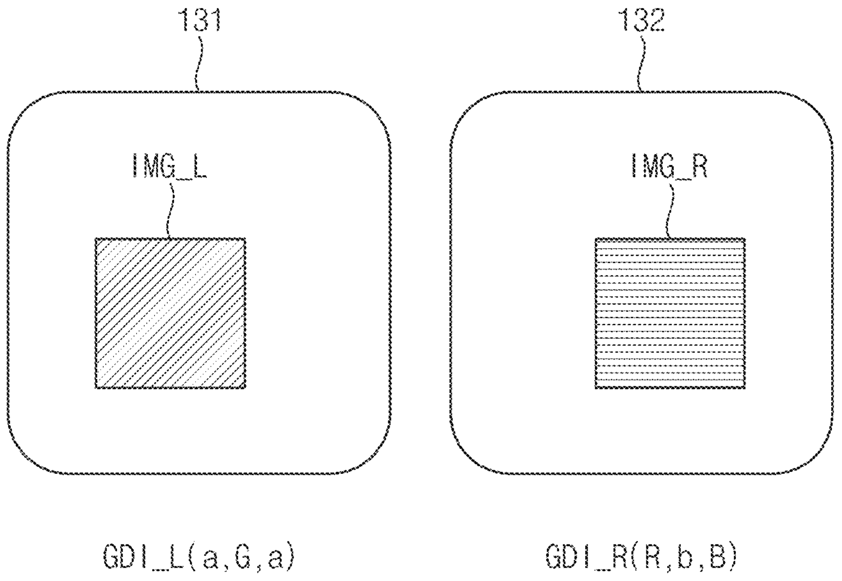
FIG. 5 is a view showing a left-eye image and a right-eye image according to an embodiment.

FIG. 4 is a view showing the left-eye image IMG_L and the right-eye image IMG_R according to an embodiment. FIG. 5 is a view showing the left-eye image IMG_L and the right-eye image IMG_R according to an embodiment.

Referring to FIGS. 4 and 5, in an embodiment, the left-eye image IMG_L may include only the first color, and the right-eye image IMG_R may include only the second and third colors.

In an embodiment, as illustrated in FIG. 4, the first color, the second color, and the third color may be red, green, and blue, respectively. In such an embodiment, the left-eye image IMG_L may display red, and the right-eye image IMG_R may display green and blue. A red grayscale value R of the left-eye input grayscale data GDI_L(R, a, a) may be the same as the red grayscale value R of the input grayscale data GDI(R, G, B), and a green grayscale value and a blue grayscale value of the left-eye input grayscale data GDI_L (R, a, a) may be a. Here, a may be a constant greater than or equal to 1. A green grayscale value G and a blue grayscale value B of the right-eye input grayscale data GDI_R(b, G, B) may be the same as the green grayscale value G and the blue grayscale value B of the input grayscale data GDI(R, G, B), respectively, and a red grayscale value of the right-eye input grayscale data GDI_R(b, G, B) may be b. Here, b may be a constant greater than or equal to 1.

In an embodiment, as illustrated in FIG. 5, the first color, the second color, and the third color may be green, red, and blue, respectively. In such an embodiment, the left-eye image IMG_L may display green, and the right-eye image IMG_R may display red and blue. The green grayscale value G of the left-eye input grayscale data GDI_L(a, G, a) may be the same as the green grayscale value G of the input grayscale data GDI(R, G, B), and the red grayscale value and the blue grayscale value of the left-eye input grayscale data GDI_L(R, a, a) may be a. The red grayscale value R and the blue grayscale value B of the right-eye input grayscale data GDI_R(R, b, B) may be the same as the red grayscale value R and the blue grayscale value B of the input grayscale data GDI(R, G, B), respectively, and the green grayscale value of the right-eye input grayscale data GDI_R(R, b, B) may be b.

Figure 6:
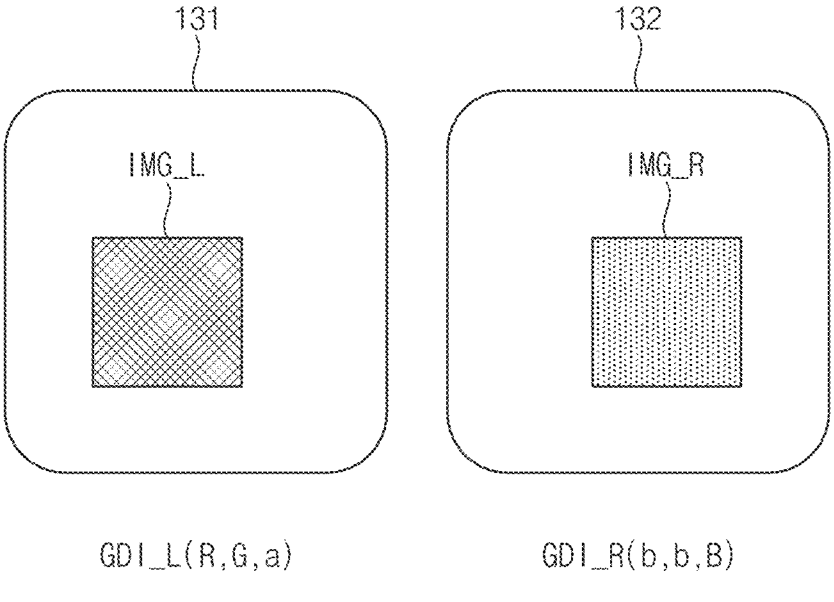
FIG. 6 is a view showing a left-eye image and a right-eye image according to an embodiment.

FIG. 6 is a view showing the left-eye image IMG_L and the right-eye image IMG_R according to an embodiment.

Referring to FIG. 6, in an embodiment, the left-eye image IMG_L may include the first and second colors, and the right-eye image IMG_R may include the third color.

In an embodiment, as illustrated in FIG. 6, the first color, the second color, and the third color may be red, green, and blue, respectively. In such an embodiment, the left-eye I mage IMG_L may display red and green, and the right-eye image IMG_R may display blue. The red grayscale value R and the green grayscale value G of the left-eye input grayscale data GDI_L(R, G, a) may be the same as the red grayscale value R and the green grayscale value G of the input grayscale data GDI(R, G, B), respectively, and the blue grayscale value of the left-eye input grayscale data GDI_L (R, G, a) may be a. The blue grayscale value B of the right-eye input grayscale data GDI_R(b, b, B) may be the same as the blue grayscale value B of the input grayscale data GDI(R, G, B), and the red grayscale value and the green grayscale value of the right-eye input grayscale data GDI_R (b, b, B) may be b.

Figure 7:
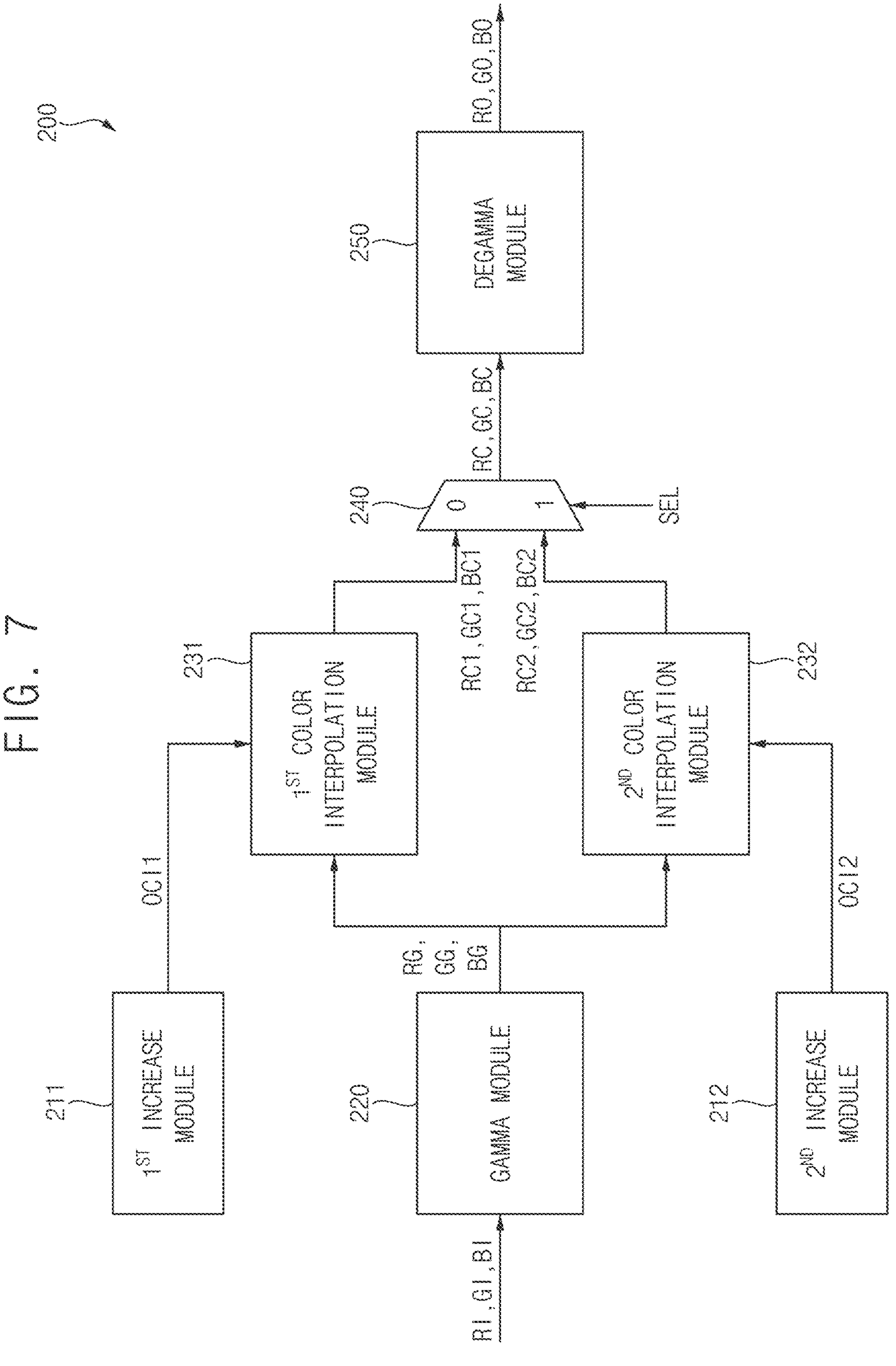
FIG. 7 is a block diagram showing a display driver integrated circuit according to an embodiment.
Figure 8:
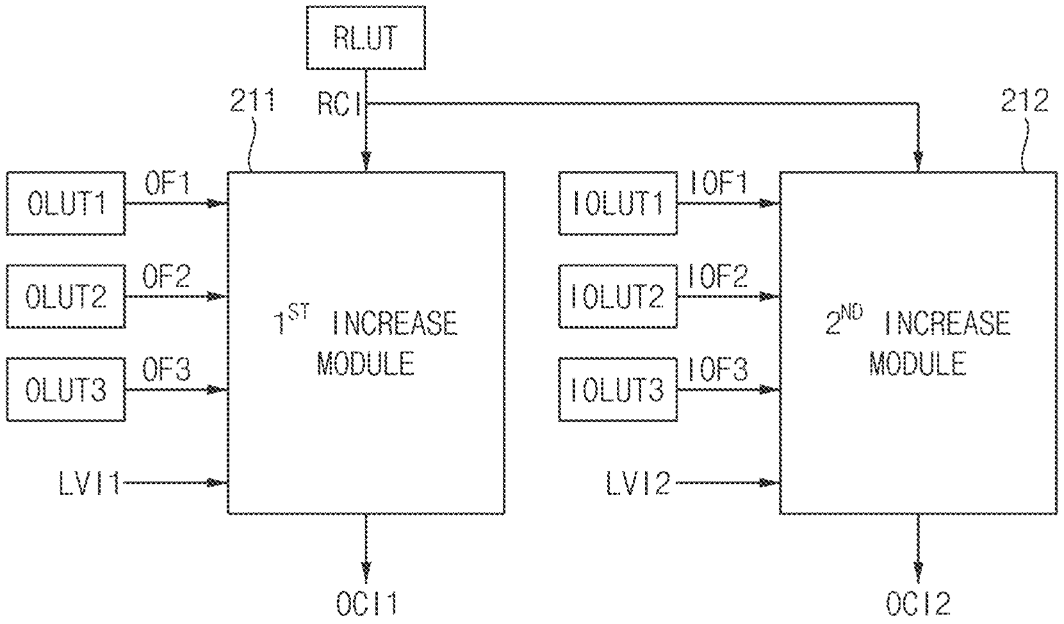
FIG. 8 is a block diagram showing first and second increase modules of FIG. 7.

FIG. 7 is a block diagram showing a display driver integrated circuit 200 according to an embodiment. The display driver integrated circuit 200 of FIG. 7 may correspond to any one of the first display driver integrated circuit 121 of FIG. 2, the second display driver integrated circuit 122 of FIG. 2, and the display driver integrated circuit 120 of FIG. 3. FIG. 8 is a block diagram showing first and second increase modules 211 and 212 of FIG. 7.

Referring to FIGS. 7 and 8, in an embodiment, the display driver integrated circuit 200 may include a first increase module 211, a second increase module 212, a gamma module 220, a first color interpolation module 231, a second color interpolation module 232, a multiplexer 240, and a degamma module 250.

The first increase module 211 may calculate first output color gamut information OCI1 corresponding to a first color shift level LVI1 based on reference color gamut information RCI corresponding to a reference level and offset information OF1, OF2, and OF3 corresponding to shift levels. The second increase module 212 may calculate second output color gamut information OCI2 corresponding to a second color shift level LVI2 based on the reference color gamut information RCI and inversion offset information IOF1, IOF2, and IOF3 obtained by inverting the offset information OF1, OF2, and OF3. Each of the reference color gamut information RCI, the offset information OF1, OF2, and OF3, and the inversion offset information IOF1, IOF2, and IOF3 may be stored in the form of a look up table (LUT). In an embodiment, for example, the reference color gamut information RCI may be stored in a reference lookup table RLUT, first offset information OF1 may be stored in a first offset lookup table OLUT1, second offset information OF2 may be stored in a second offset lookup table OLUT2, third offset information OF3 may be stored in a third offset lookup table OLUT3, first inversion offset information IOF1 may be stored in a first inversion offset lookup table IOLUT1, second inversion offset information IOF2 may be stored in a second inversion offset lookup table IOLUT2, and third inversion offset information IOF3 may be stored in a third inversion offset lookup table IOLUT3.

In an embodiment, the reference color gamut information RCI, the offset information OF1, OF2, and OF3, and the inversion offset information IOF1, IOF2, and IOF3 may be stored in advance during the manufacturing of the electronic device 100. In an embodiment, the reference color gamut information RCI, the offset information OF1, OF2, and OF3, and the inversion offset information IOF1, IOF2, and IOF3 may be determined during the operation of the electronic device 100. In an embodiment, for example, a user of the electronic device 100 may set the reference color gamut information RCI, the offset information OF1, OF2, and OF3, and the inversion offset information IOF1, IOF2, and IOF3. In an embodiment, the reference color gamut information RCI, the offset information OF1, OF2, and OF3, and the inversion offset information IOF1, IOF2, and IOF3 may change through an update of the electronic device 100.

The gamma module 220 may generate gamma grayscale values RG, GG, BG by applying a gamma curve to input grayscale values RI, GI, BI included in the left-eye input grayscale data GDI_L and the right-eye input grayscale data GDI R.

The first color interpolation module 231 may generate first compensation grayscale values RC1, GC1, BC1 by interpolating the gamma grayscale values RG, GG, BG and the first output color gamut information OCI1. The second color interpolation module 232 may generate second compensation grayscale values RC2, GC2, BC2 by interpolating the gamma grayscale values RG, GG, BG and the second output color gamut information OCI2.

The multiplexer 240 may output one of the first compensation grayscale values RC1, GC1, BC1 and the second compensation grayscale values RC2, GC2, BC2 as compensation grayscale values RC, GC, BC based on a selection signal SEL. The multiplexer 240 may output the first compensation grayscale values RC1, GC1, BC1 as the compensation grayscale values RC, GC, BC when the selection signal SEL is 0, and the multiplexer 240 may output the second compensation grayscale values RC2, GC2, BC2 as the compensation grayscale values RC, GC, BC when the selection signal SEL is 1.

In an embodiment where the display driver integrated circuit 200 corresponds to the first display driver integrated circuit 121 of FIG. 2, the selection signal SEL may be 0. In an embodiment where the display driver integrated circuit 200 corresponds to the second display driver integrated circuit 122 of FIG. 2, the selection signal SEL may be 1. In an embodiment where the display driver integrated circuit 200 corresponds to the display driver integrated circuit 120 of FIG. 3, the selection signal SEL may vary depending on data input to the display driver integrated circuit 200. The selection signal may be 0 when the left-eye input grayscale data GDI_L is input to the display driver integrated circuit 200, and the selection signal may be 1 when the right-eye input grayscale data GDI_R is input to the display driver integrated circuit 200.

The degamma module 250 may generate output grayscale values RO, GO, BO included in the left-eye output grayscale data GDO_L and the right-eye output grayscale data GDO_R by applying an inverse gamma curve to the compensation grayscale values RC, GC, BC.

Figure 9:
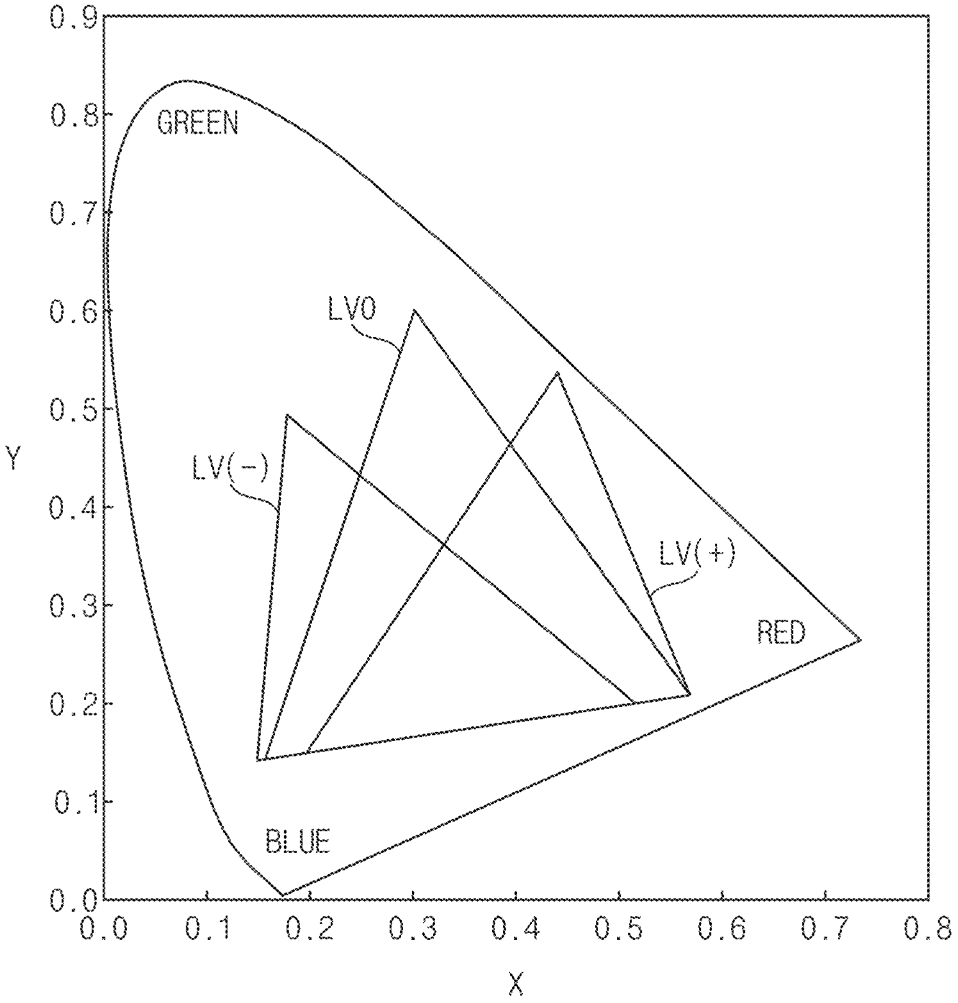
FIG. 9 is a view for describing output color gamut information according to a color shift level.

FIG. 9 is a view for describing output color gamut information according to a color shift level.

Referring to FIG. 9, in a color space specified in CIE 1931, a reference color gamut according to the reference level LV0, a first color gamut according to an arbitrary first shift level LV(+), and a second color gamut according to an arbitrary second shift level LV(−) are illustrated.

The first color gamut may have a larger proportion of a red region than the reference color gamut. Accordingly, a first output color gamut corresponding to the first output color gamut information OCI1 may have a larger proportion of the red region than the reference color gamut corresponding to the reference color gamut information RCI. A second color gamut may have a smaller proportion of the red region than the reference color gamut. Accordingly, the second output color gamut corresponding to the second output color gamut information OCI2 may have a smaller proportion of the red region than the reference color gamut corresponding to the reference color gamut information RCI.

Figure 10:
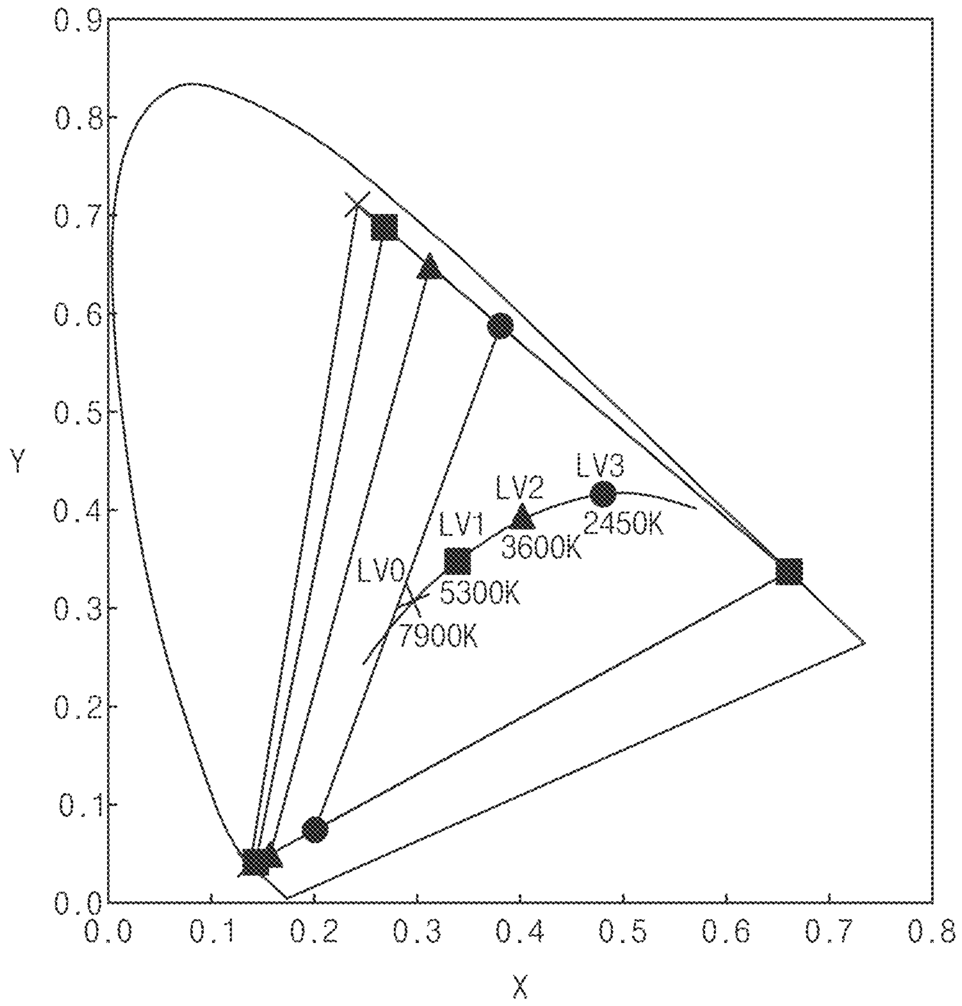
FIG. 10 is a view showing a first output color gamut.

FIG. 10 is a view showing the first output color gamut.

Referring to FIG. 10, the reference color gamut (vertices are X) when the first color shift level LVI1 is the reference level LV0, the first color gamut (vertices are squares) when the first color shift level LVI1 is a first level LV1, the first color gamut (vertices are triangles) when the first color shift level LVI1 is a second level LV2, and the first color gamut (vertices are circles) when the first color shift level LVI1 is a third level LV3 are illustrated. The first level LV1, the second level LV2, and the third level LV3 may be the first shift levels, and the third level LV3 may be the maximum level of the first shift levels. In an embodiment, for example, the reference color gamut may be set to a color temperature of white grayscale of 7900K when the first color shift level LVI1 is the reference level LV0, the first color gamut may be set to a color temperature of white grayscale of 5300K when the first color shift level LVI1 is the first level LV1, the first color gamut may be set to a color temperature of white grayscale of 3600K when the first color shift level LVI1 is the second level LV2, and the first color gamut may be set to a color temperature of white grayscale of 2450K when the first color shift level LVI1 is the third level LV3.

FIG. 11 is a view showing the reference color gamut information RCI, first to third level color gamut information LCI1, LCI2, and LCI3, and the first to third offset information OF1, OF2, and OF3.

Referring to FIG. 11, the reference color gamut information RCI corresponding to the reference level LV0, first level color gamut information LCI1 corresponding to the first level LV1, second level color gamut information LCI2 corresponding to the second level LV2, third level color gamut information LCI3 corresponding to the third level LV3, the first offset information OF1, the second offset information OF2, and the third offset information OF3 are illustrated. In an embodiment, for example, each of the reference color gamut information RCI, the first level color gamut information LCI1, the second level color gamut information LCI2, the third level color gamut information LCI3, the first offset information OF1, the second offset information OF2, and the third offset information OF3 may have a 7×3 matrix form.

A first row, a second row, a third row, a fourth row, a fifth row, a sixth row, and a seventh row of each of the reference color gamut information RCI, the first level color gamut information LCI1, the second level color gamut information LCI2, and the third level color gamut information LCI3 may represent red grayscale information, green grayscale information, blue grayscale information, cyan grayscale information, magenta grayscale information, yellow grayscale information, and white grayscale information, respectively. A first column, a second column, and a third column of each of the reference color gamut information RCI, the first level color gamut information LCI1, the second level color gamut information LCI2, and the third level color gamut information LCI3 may represent a red grayscale value, a green grayscale value, and a blue grayscale value, respectively.

The first offset information OF1 may correspond to a difference value between the reference color gamut information RCI and the first level color gamut information LCI1. The second offset information OF2 may correspond to a difference value between the first level color gamut information LCI1 and the second level color gamut information LCI2. The third offset information OF3 may correspond to a difference value between the second level color gamut information LCI2 and the third level color gamut information LCI3.

The first to third offset lookup tables OLUT1, OLUT2, and OLUT3 may store the first to third offset information OF1, OF2, and OF3, and sizes of the first to third offset information OF1, OF2, and OF3 may be smaller than sizes of the first to third level color gamut information LCI1, LCI2, and LCI3. Accordingly, sizes of the first to third offset lookup tables OLUT1, OLUT2, and OLUT3 may be reduced, and manufacturing cost of the display driver integrated circuit 200 may be reduced.

In an embodiment, the first increase module 211 may calculate the first output color gamut information OCI1 corresponding to the first color shift level LVI1 based on the reference color gamut information RCI and the offset information OF1, OF2, and OF3. In an embodiment, for example, the first color shift level LVI1 corresponding to the reference level LV0 may be 0, and the first color shift levels LVI1 corresponding to the first shift levels LV1, LV2, and LV3 may be 102, 178, and 255.

When the first color shift level LVI1 is between the reference level LV0 and the first level LV1, the first increase module 211 may calculate first differential information DI1 based on Mathematical formula 1.

$$DI1 = \text{round}((OF1/LV1)*LVI1) \quad \text{[Mathematical formula 1]}$$

When the first color shift level LVI1 is between the first level LV1 and the second level LV2, the first increase module 211 may calculate the first differential information DI1 based on Mathematical formula 2.

$$DI1 = \text{round}((OF2/(LV2-LV1))*(LVI1-LV1))+OF1 \quad \text{[Mathematical formula 2]}$$

When the first color shift level LVI1 is between the second level LV2 and the third level LV3, the first increase module 211 may calculate the first differential information DI1 based on Mathematical formula 3.

$$DI1 = \text{round}((OF3/(LV3-LV2))*(LVI1-LV2))+OF1+OF2 \quad \text{[Mathematical formula 3]}$$

In an embodiment, the first increase module 211 may calculate the first output color gamut information OCI1 by adding the first differential information DI1 to the reference color gamut information RCI.

FIG. 12 is a view showing the first to third inversion offset information IOF1, IOF2, and IOF3.

Referring to FIG. 12, in an embodiment, the first inversion offset information IOF1 may include grayscale values whose signs (or polarities) are inverted from grayscale values included in the first offset information OF1. The second inversion offset information IOF2 may include grayscale values whose signs are inverted from grayscale values included in the second offset information OF2. The third inversion offset information IOF3 may include grayscale values whose signs are inverted from grayscale values included in the third offset information OF3.

The second increase module 212 may calculate the second output color gamut information OCI2 corresponding to the second color shift level LVI2 based on the reference color gamut information RCI and the inversion offset information IOF1, IOF2, and IOF3. In an embodiment, for example, the second color shift level LVI2 corresponding to the reference level LV0 may be 0, and the second color shift levels LVI2 corresponding to the second shift levels ILV1, ILV2, and ILV3 may be −102, −178, −255. The second shift levels ILV1, ILV2, and ILV3 may include a first inversion level ILV1, a second inversion level ILV2, and a third inversion level ILV3, and the first inversion level ILV1, the second inversion level ILV2, and the third inversion level ILV3 may be values obtained by inverting signs of the first level LV1, the second level LV2, and the third level LV3, respectively.

When the second color shift level LVI2 is between the reference level LV0 and the first inversion level ILV1, the second increase module 212 may calculate second differential information DI2 based on Mathematical formula 4.

$$DI2 = \text{round}((IOF1/ILV1)*LVI2) = \text{round}((-OF1/-LV1)*LVI2) \quad \text{[Mathematical formula 4]}$$

When the second color shift level LVI2 is between the first inversion level ILV1 and the second inversion level ILV2, the second increase module 212 may calculate the second differential information DI2 based on Mathematical formula 5.

$$DI2 = \text{round}((IOF2/(ILV2-ILV1))*(LVI2-ILV1))+IOF1 = \text{round}((-OF2/(LV1-LV2))*(LVI2+LV1))-OF1 \quad \text{[Mathematical formula 5]}$$

When the second color shift level LVI2 is between the second inversion level ILV2 and the third inversion level ILV3, the second increase module 212 may calculate the second differential information DI2 based on Mathematical formula 6.

$$DI2 = \text{round}((IOF3/(ILV3-ILV2))*(LVI2-LV2))+IOF1+IOF2 = \text{round}((-OF3/(LV2-LV3))*(LVI2+LV2))-OF1-OF2 \quad \text{[Mathematical formula 6]}$$

In an embodiment, the second differential information DI2 may be calculated using the first offset information OF1, the second offset information OF2, the third offset information OF3, the first level LV1, the second level LV2, and the third level LV3 instead of the first inversion offset information IOF1, the second inversion offset information IOF2, the third inversion offset information IOF3, the first inversion level ILV1, the second inversion level ILV2, and the third inversion level ILV3. The first inversion offset information IOF1, the second inversion offset information IOF2, the third inversion offset information IOF3, the first inversion level ILV1, the second inversion level ILV2, and the third inversion level ILV3 may be values obtained by inverting signs of the first offset information OF1, the second offset information OF2, the third offset information OF3, the first level LV1, the second level LV2, and the third level LV3, respectively. In this case, the second differential information DI2 is calculated using parameters for calculating the first differential information DI1, such that the number of parameters for calculating the first differential information DI1 and the second differential information DI2 may be reduced.

In an embodiment, the second increase module 212 may calculate the second output color gamut information OCI2 by adding the second differential information DI2 to the reference color gamut information RCI.

Figure 13:
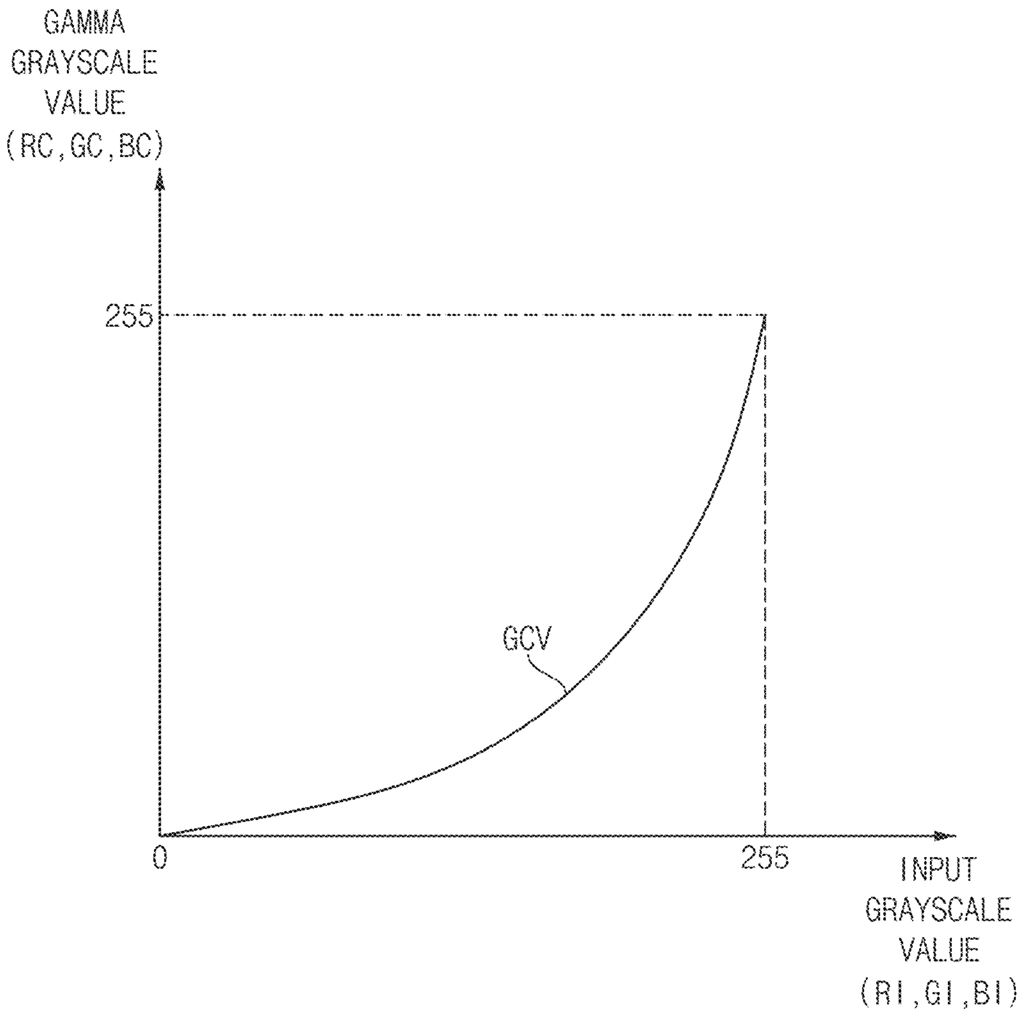
FIG. 13 is a view for describing an application of a gamma curve.

FIG. 13 is a view for describing an application of the gamma curve GCV.

Referring to FIG. 13, the gamma module 220 may generate the gamma grayscale values RG, GG, BG by applying the gamma curve GCV to the input grayscale values RI, GI, BI. In an embodiment, for example, a gamma value (or gamma characteristics) of the gamma curve GCV may be 2.0, 2.2, or 2.4. In an embodiment, a user may set the gamma value of the gamma curve GCV.

Figure 14:
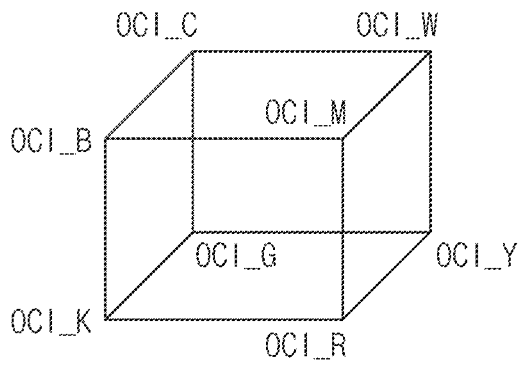
FIG. 14 is a view for describing color interpolation.

FIG. 14 is a view for describing color interpolation.

Referring to FIG. 14, in an embodiment, the first color interpolation module 231 may generate the first compensation grayscale values RC1, GC1, BC1 by interpolating the gamma grayscale values RG, GG, BG and the first output color gamut information OCI1. The second color interpolation module 232 may generate the second compensation grayscale values RC2, GC2, BC2 by interpolating the gamma grayscale values RG, GG, BG and the second output color gamut information OCI2.

Each of the first output color gamut information OCI1 and the second output color gamut information OCI2 may include red grayscale information OCI_R, green grayscale information OCI_G, blue grayscale information OCI_B, cyan grayscale information OCI_C, magenta grayscale information OCI_M, yellow grayscale information OCI_Y, white grayscale information OCI_W, and black grayscale information OCI_K.

The first color interpolation module 231 may generate the first compensation grayscale values RC1, GC1, BC1 within a range of the first output color gamut information OCI1. The second color interpolation module 232 may generate the second compensation grayscale values RC2, GC2, BC2 within a range of the second output color gamut information OCI2. FIG. 14 illustrates a cube in which the black grayscale information LVI_K is positioned at the origin, and the red grayscale information OCI_R, the green grayscale information OCI_G, and the blue grayscale information OCI_B correspond to three coordinate axes that are orthogonal to each other.

The first compensation grayscale values RC1, GC1, BC1 and the second compensation grayscale values RC2, GC2, BC2 may be calculated by a table illustrated in FIG. 14 and Mathematical formulas 7, 8, and 9.

$$RC1(RC2) = \text{OCI\_K\_R} + \text{C1\_R} * RG/\text{r\_step} + \text{C2\_R} * GG/\text{g\_step} + \text{C3\_R} * BG/\text{b\_step} \quad \text{[Mathematical formula 7]}$$

$$GC1(GC2) = \text{OCI\_K\_G} + \text{C1\_G} * RG/\text{r\_step} + \text{C2\_G} * GG/\text{g\_step} + \text{C3\_G} * BG/\text{b\_step} \quad \text{[Mathematical formula 8]}$$

$$BC1(BC2) = \text{OCI\_K\_B} + \text{C1\_B} * RG/\text{r\_step} + \text{C2\_B} * GG/\text{g\_step} + \text{C3\_B} * BG/\text{b\_step} \quad \text{[Mathematical formula 9]}$$

Here, OCI_K_R denotes a red grayscale value of the black grayscale information OCI_K, OCI_K_G denotes a green grayscale value of the black grayscale information OCI_K, OCI_K_B denotes a blue grayscale value of the black grayscale information OCI_K, C1_R denotes a red grayscale value of C1 calculated according to the table, C1_G denotes a green grayscale value of C1 calculated according to the table, C1_B denotes a blue grayscale value of C1 calculated according to the table, C2_R denotes a red grayscale value of C2 calculated according to the table, C2_G denotes a green grayscale value of C2 calculated according to the table, C2_B denotes a blue grayscale value of C2 calculated according to the table, C3_R denotes a red grayscale value of C3 calculated according to the table, C3_G denotes a green grayscale value of C3 calculated according to the table, and C3_B denotes a blue grayscale value of C3 calculated according to the table. Each of r_step, g_step, and b_step may be a constant. For example, each of r_step, g_step, and b_step may be 128.

Figure 15:
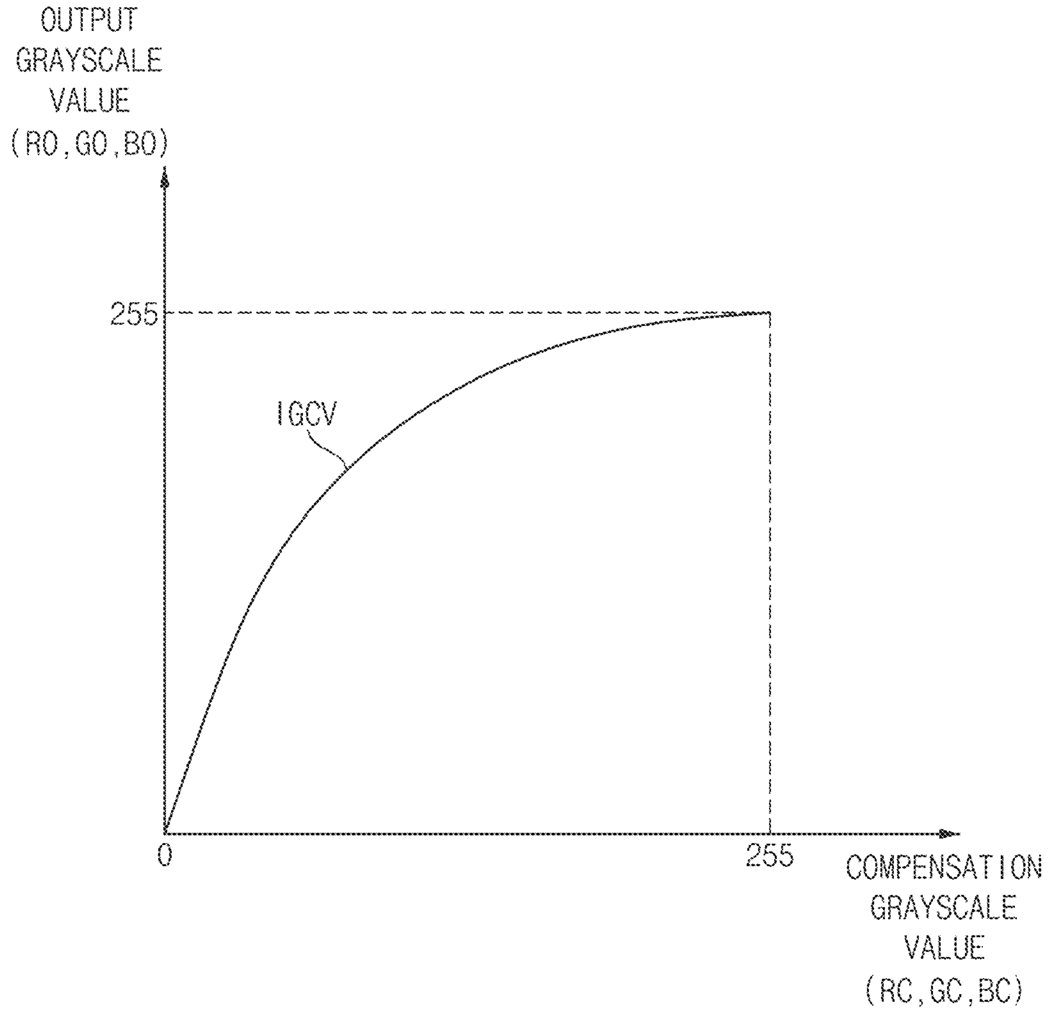
FIG. 15 is a view for describing an application of an inverse gamma curve.

FIG. 15 is a view for describing an application of the inverse gamma curve IGCV.

Referring to FIG. 15, in an embodiment, the degamma module 250 may generate the output grayscale values RO, GO, BO by applying the inverse gamma curve IGCV to the compensation grayscale values RC, GC, BC. An inverse gamma value of the inverse gamma curve IGCV may be the reciprocal (or multiplicative inverse) of the gamma value of the gamma curve GCV.

Figure 16:
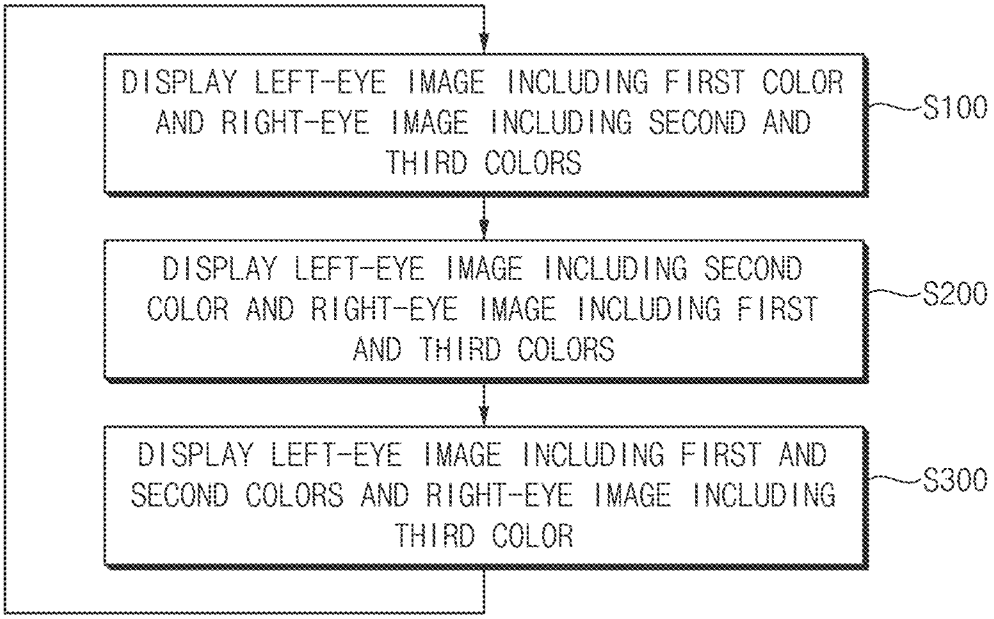
FIG. 16 is a flowchart showing a method of driving the electronic device according to an embodiment.

FIG. 16 is a flowchart showing a method of driving the electronic device 100 according to an embodiment.

Referring to FIG. 16, in an embodiment of the method of driving the electronic device 100, the left-eye image IMG_L including the first color and the right-eye image IMG_R including the second and third colors may be displayed in a first display period (S100), and the left-eye image IMG_L including the second color and the right-eye image IMG_R including the first and third colors may be displayed in a second display period (S200). In an embodiment, the left-eye image IMG_L including the first and second colors and the right-eye image IMG_R including the third color may be displayed in a third display period (S300).

In an embodiment, the first color, the second color, and the third color may be red, green, and blue, respectively. In such an embodiment, the left-eye image IMG_L including red and the right-eye image IMG_R including green and blue may be displayed in the first display period as illustrated in FIG. 4, the left-eye image IMG_L including green and the right-eye image IMG_R including red and blue may be displayed in the second display period as illustrated in FIG. 5, and the left-eye image IMG_L including red and green and the right-eye image IMG_R including blue may be displayed in the third display period as illustrated in FIG. 6.

In an embodiment, the first display period, the second display period, and the third display period may be sequentially repeated. When a user views an image of the same color for a long time, the user's eye fatigue may increase. In an embodiment of the disclosure, the color included in the left-eye image IMG_L and the color included in the right-eye image IMG_R change according to the first to third display periods, such that the user's eye fatigue may be reduced.

The electronic device according to the embodiments may be applied to an electronic device including a head mounted display (HMD), or the like.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. An electronic device comprising:

a first display panel which displays a left-eye image;

a second display panel which displays a right-eye image;

a display driver integrated circuit which provides left-eye output grayscale data to the first display panel and provides right-eye output grayscale data to the second display panel; and a processor which provides left-eye input grayscale data and right-eye input grayscale data to the display driver integrated circuit, wherein each of the left-eye image and the right-eye image includes one or two selected from a first color, a second color different from the first color, and a third color different from the first and second colors, and wherein the display driver integrated circuit includes:

a first increase module which calculates first output color gamut information corresponding to a first color shift level based on reference color gamut information corresponding to a reference level and offset information corresponding to shift levels; and a second increase module which calculates second output color gamut information corresponding to a second color shift level based on the reference color gamut information and inversion offset information obtained by inverting the offset information.

2. The electronic device of claim 1, wherein the left-eye image includes only the first color, and the right-eye image includes only the second and third colors.

3. The electronic device of claim 2, wherein the first color, the second color, and the third color are red, green, and blue, respectively.

4. The electronic device of claim 2, wherein the first color, the second color, and the third color are green, red, and blue, respectively.

5. The electronic device of claim 1, wherein the left-eye image includes only the first and second colors, and the right-eye image includes only the third color.

6. The electronic device of claim 5, wherein the first color, the second color, and the third color are red, green, and blue, respectively.

7. The electronic device of claim 1, wherein the display driver integrated circuit includes:

a first display driver integrated circuit which converts the left-eye input grayscale data into the left-eye output grayscale data to shift a color gamut of the left-eye image; and a second display driver integrated circuit which converts the right-eye input grayscale data into the right-eye output grayscale data to shift a color gamut of the right-eye image.

8. The electronic device of claim 1, wherein the display driver integrated circuit converts the left-eye input grayscale data into the left-eye output grayscale data to shift a color gamut of the left-eye image, and converts the right-eye input grayscale data into the right-eye output grayscale data to shift a color gamut of the right-eye image.

9. The electronic device of claim 1, wherein the display driver integrated circuit further includes:

a gamma module which generates a gamma grayscale value by applying a gamma curve to an input grayscale included in the left-eye input grayscale data and the right-eye input grayscale data.

10. The electronic device of claim 9, wherein the display driver integrated circuit further includes:

a first color interpolation module which generates a first compensation grayscale value by interpolating the gamma grayscale value and the first output color gamut information; and a second color interpolation module which generates a second compensation grayscale value by interpolating the gamma grayscale value and the second output color gamut information.

11. The electronic device of claim 10, wherein the display driver integrated circuit further includes:

a multiplexer which outputs one selected from the first compensation grayscale value and the second compensation grayscale value as a compensation grayscale value based on a selection signal; and a degamma module which generates an output grayscale value included in the left-eye output grayscale data and the right-eye output grayscale data by applying an inverse gamma curve to the compensation grayscale value.

12. The electronic device of claim 1, wherein the left-eye image includes only the first color and the right-eye image includes only the second and third colors in a first display period, and wherein the left-eye image includes only the second color and the right-eye image includes only the first and third colors in a second display period.

13. The electronic device of claim 12, wherein the left-eye image includes only the first and second colors and the right-eye image includes only the third color in a third display period.

14. The electronic device of claim 13, wherein the first color, the second color, and the third color are red, green, and blue, respectively.

15. The electronic device of claim 13, wherein the first display period, the second display period, and the third display period are sequentially repeated.

16. A method of driving an electronic device comprising a first display panel which displays a left-eve image, a second display panel which displays a right-eve image, a display driver integrated circuit which provides left-eye output grayscale data to the first display panel and provides right-eye output grayscale data to the second display panel, the display driver integrated circuit including a first increase module which calculates first output color gamut information corresponding to a first color shift level based on reference color gamut information corresponding to a reference level and offset information corresponding to shift levels and a second increase module which calculates second output color gamut information corresponding to a second color shift level based on the reference color gamut information and inversion offset information obtained by inverting the offset information, and a processor which provides left-eye input grayscale data and right-eye input grayscale data to the display driver integrated circuit, the method comprising:

displaying the left-eye image including only a first color and the right-eye image including only a second color different from the first color and a third color different from the first and second colors in a first display period, and displaying the left-eye image including only the second color and the right-eye image including only the first and third colors in a second display period.

17. The method of claim 16, further comprising:

displaying the left-eye image including only the first and second colors and the right-eye image including only the third color in a third display period.

18. The method of claim 17, wherein the first color, the second color, and the third color are red, green, and blue, respectively.

19. The method of claim 17, wherein the first display period, the second display period, and the third display period are sequentially repeated.

* * * * *